United States Patent [19]

Evangelisti et al.

[11] Patent Number: 4,823,281

[45] Date of Patent: Apr. 18, 1989

[54] COLOR GRAPHIC PROCESSOR FOR PERFORMING LOGICAL OPERATIONS

[75] Inventors: Carlo J. Evangelisti, Jefferson Valley, N.Y.; Leon Lumelsky, Stamford, Conn.

[73] Assignee: IBM Corporation, Armonk, N.Y.

[21] Appl. No.: 129,970

[22] Filed: Dec. 4, 1987

Related U.S. Application Data

[63] Continuation of Ser. No. 729,003, Apr. 30, 1985, abandoned.

[51] Int. Cl.[4] .............................................. G06F 3/14
[52] U.S. Cl. ................................. 364/518; 340/747; 364/900
[58] Field of Search ............... 364/521, 200 MS File, 364/900 MS File, 518; 340/747, 721; 358/160

[56] References Cited

U.S. PATENT DOCUMENTS

| | | | |
|---|---|---|---|
| 4,459,677 | 7/1984 | Porter | 364/900 |
| 4,484,187 | 11/1984 | Brown | 340/747 |
| 4,528,636 | 7/1985 | Robinson | 364/521 |
| 4,532,503 | 6/1985 | Pennebaker | 340/747 |
| 4,564,915 | 1/1986 | Evans | 365/521 |
| 4,589,089 | 5/1986 | Frederiksen | 364/900 |
| 4,595,917 | 6/1986 | McCallister | 364/521 |
| 4,615,013 | 9/1986 | Yan | 364/521 |
| 4,631,690 | 12/1986 | Corthout | 364/521 |
| 4,631,691 | 12/1986 | Pica | 364/521 |
| 4,642,790 | 2/1987 | Minshull et al. | 364/521 |
| 4,673,930 | 6/1987 | Bujalski et al. | 340/721 |
| 4,682,297 | 7/1987 | Iwami | 340/721 |
| 4,710,764 | 12/1987 | Van Cang | 340/721 |

OTHER PUBLICATIONS

FT-1024 User's Manual (Forward Technology Inc., Santa Clara, CA, 1982).
"Multiple Pseudo Color Looking Tables in Raster Graphic and Image Displays", IBM Tech. Discl. Bull., vol. 26, No. 7A, pp. 3409-3418, Dec. 1983.

*Primary Examiner*—Gary V. Harkcom
*Assistant Examiner*—Lawrence E. Anderson
*Attorney, Agent, or Firm*—Pollock, Vande Sande & Priddy

[57] ABSTRACT

A color graphic processor includes one or more processing elements responsive to pixel data provided by a frame buffer. The processing element stores pixels from the frame buffer in source and destination registers. The arithmetic logic unit (ALU) portion of the processing element includes a random access memory (RAM) addressed by the registers to produce a result pixel value which can be written back to the frame buffer. The RAM can implement a wide variety of pixel operations by loading the RAM with operation specific data.

13 Claims, 12 Drawing Sheets

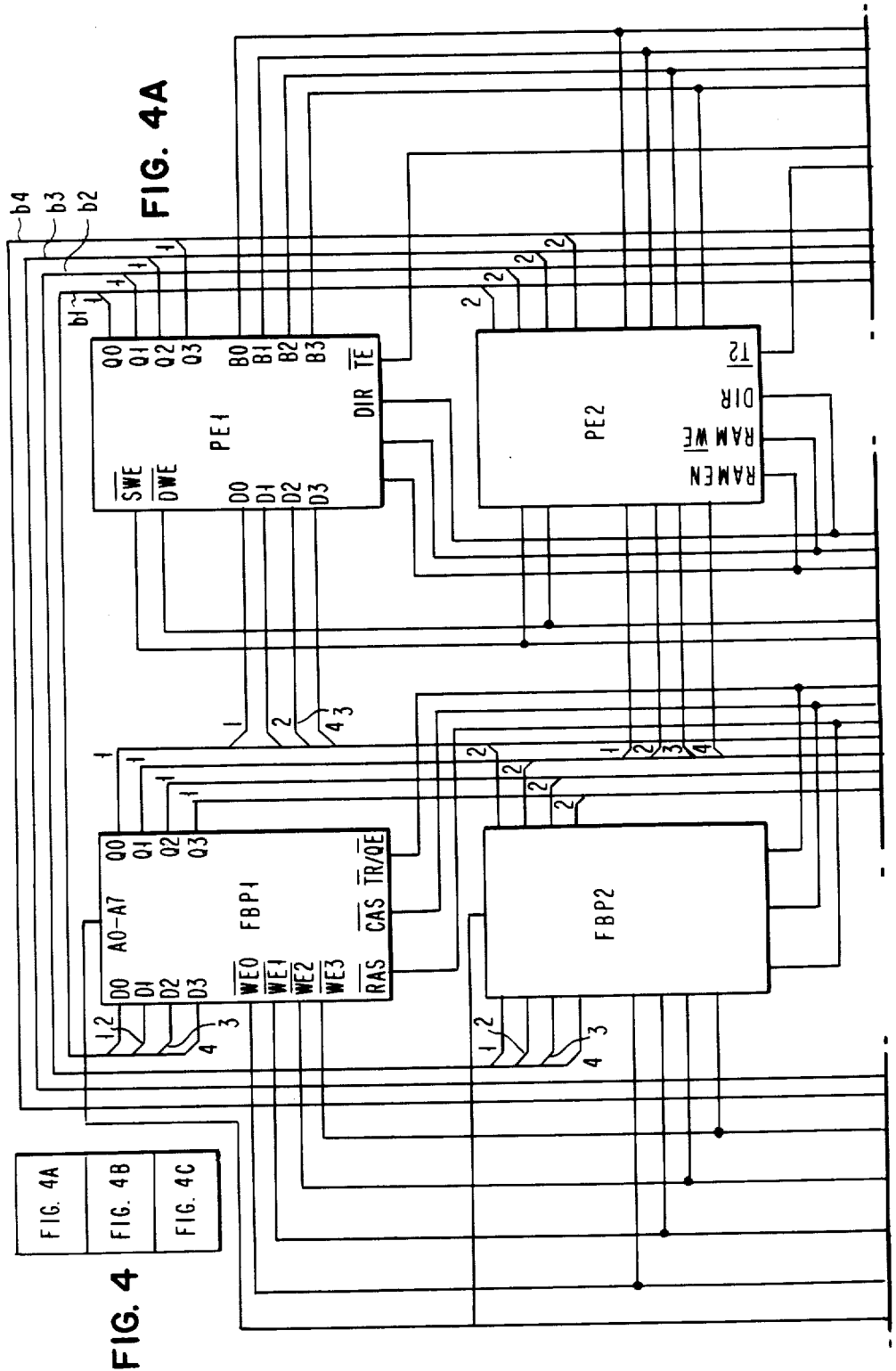

FIG. 5A

| OPERATION | U(1-9) | SEQUENCE CLOCK CYCLE | | | | PSR | WMR |
|---|---|---|---|---|---|---|---|
| | | 1 | 2 | 3 | 4 | | |
| PERAM→FB | 1 | 1 | 1 | 0 | 1 | DO NOT CARE | ANY NUMBER FROM 0 TO 14 |
| | 2 | 0 | 0 | 0 | 1 | | |
| | 3 | 1 | 0 | 0 | 1 | | |
| | 4 | 1 | 1 | 1 | 1 | | |
| | 5 | 1 | 1 | 1 | 1 | | |
| | 6 | 1 | 1 | 1 | 1 | | |
| | 7 | 1 | 0 | 0 | 1 | | |
| | 8 | 1 | 1 | 1 | 1 | | |
| | 9 | X | X | X | X | | |
| FB→PESR | 1 | 1 | 1 | 1 | 1 | DO NOT CARE | DO NOT CARE |
| | 2 | 0 | 0 | 0 | 1 | | |
| | 3 | 1 | 0 | 0 | 1 | | |
| | 4 | 1 | 1 | 0 | 1 | | |
| | 5 | 1 | 1 | 0 | 1 | | |
| | 6 | 1 | 1 | 1 | 1 | | |
| | 7 | 1 | 1 | 1 | 1 | | |
| | 8 | 1 | 1 | 1 | 1 | | |
| | 9 | X | X | X | X | | |
| FB→PEDR | 1-4 | SAME AS PRIOR OP | | | | DO NOT CARE | DO NOT CARE |
| | 5 | 1 | 1 | 1 | 1 | | |
| | 6 | 1 | 1 | 0 | 1 | | |
| | 7-9 | SAME AS PRIOR OP | | | | | |
| FB→HOST | 1 | 1 | 1 | 1 | 1 | ANY NUMBER 14,13, 11 or 7 | DO NOT CARE |
| | 2 | 0 | 0 | 0 | 1 | | |
| | 3 | 1 | 0 | 0 | 1 | | |
| | 4 | 1 | 1 | 0 | 1 | | |
| | 5 | 1 | 1 | 1 | 1 | | |
| | 6 | 1 | 1 | 1 | 1 | | |
| | 7 | 1 | 1 | 1 | 1 | | |
| | 8 | 1 | 1 | 1 | 1 | | |
| | 9 | 1 | 0 | 0 | 1 | | |

FIG. 5B

| OPERATION | U(1-9) | SEQUENCE CLOCK CYCLE | | | | PSR | WMR |
|---|---|---|---|---|---|---|---|
| | | 1 | 2 | 3 | 4 | | |
| HOST→FB | 1 | 1 | 1 | 0 | 1 | DO NOT CARE | ANY NUMBER FROM 0 TO 14 |
| | 2 | 0 | 0 | 0 | 1 | | |
| | 3 | 1 | 0 | 0 | 1 | | |
| | 4 | 1 | 1 | 1 | 1 | | |
| | 5 | 1 | 1 | 1 | 1 | | |
| | 6 | 1 | 1 | 1 | 1 | | |
| | 7 | 1 | 1 | 1 | 1 | | |
| | 8 | 1 | 0 | 0 | 1 | | |
| | 9 | 1 | 0 | 0 | 1 | | |
| HOST→PESR | 1 | 1 | 1 | 1 | 1 | 0 | DO NOT CARE |
| | 2 | 1 | 1 | 1 | 1 | | |
| | 3 | 1 | 1 | 1 | 1 | | |
| | 4 | 1 | 1 | 1 | 1 | | |
| | 5 | 1 | 1 | 0 | 1 | | |
| | 6 | 1 | 1 | 1 | 1 | | |
| | 7 | 1 | 1 | 1 | 1 | | |
| | 8 | 1 | 1 | 1 | 1 | | |
| | 9 | 1 | 0 | 0 | 1 | | |
| HOST→PEDR | 1-4 | SAME AS PRIOR OP | | | | 0 | DO NOT CARE |
| | 5 | 1 | 1 | 1 | 1 | | |
| | 6 | 1 | 1 | 0 | 1 | | |
| | 7-9 | SAME AS PRIOR OP | | | | | |
| HOST→PERAM | 1-4 | SAME AS PRIOR OP | | | | 0 | DO NOT CARE |
| | 5 | 1 | 1 | 1 | 1 | | |
| | 6 | 1 | 1 | 1 | 1 | | |
| | 7 | 1 | 0 | 0 | 1 | | |
| | 8 | 1 | 1 | 0 | 1 | | |
| | 9 | 1 | 1 | 0 | 1 | | |

PIXEL A   PIXEL T   PIXEL B

|   | S | D | NEW D |
|---|---|---|-------|
| 1 | A | B | A |
| 2 | T | B | B |
| 3 | A | T | A |
| 4 | T | T | T |

FIG. 7
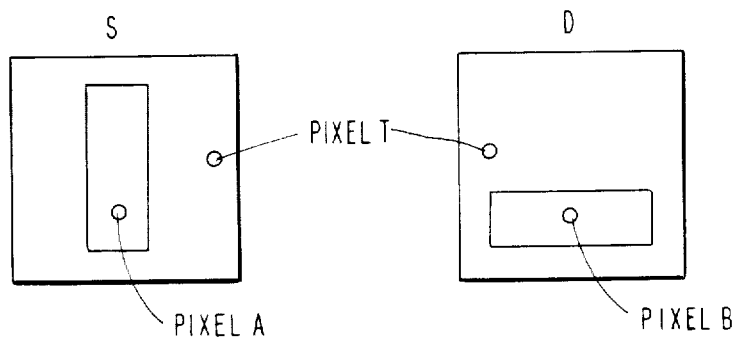
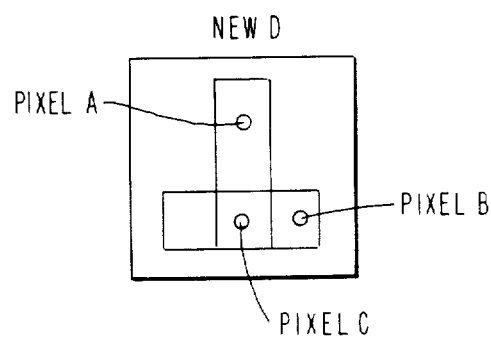
| S | D | NEW D |
|---|---|-------|
| A | B | C |
| A | T | A |
| T | B | B |
| T | T | T |

FIG. 8
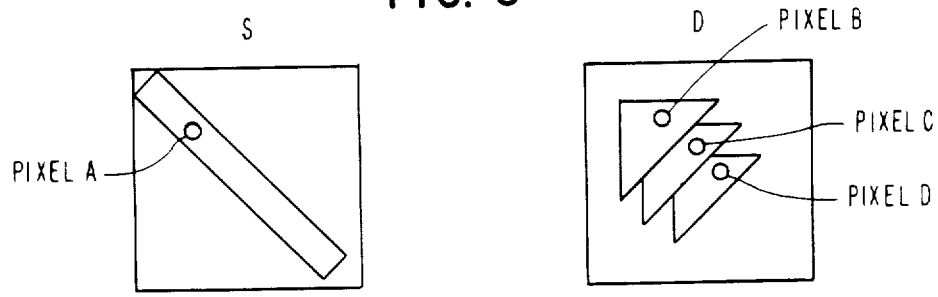
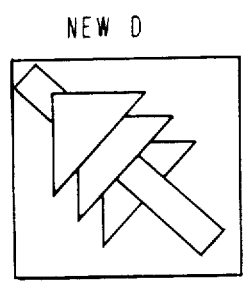
| S | D | NEW D |
|---|---|---|
| A | B | B |
| A | C | C |
| A | D | A      ← SOURCE IS COPIED |
| A | T | A |
| T | B | B |
| T | C | C |
| T | D | D |
| T | T | T |

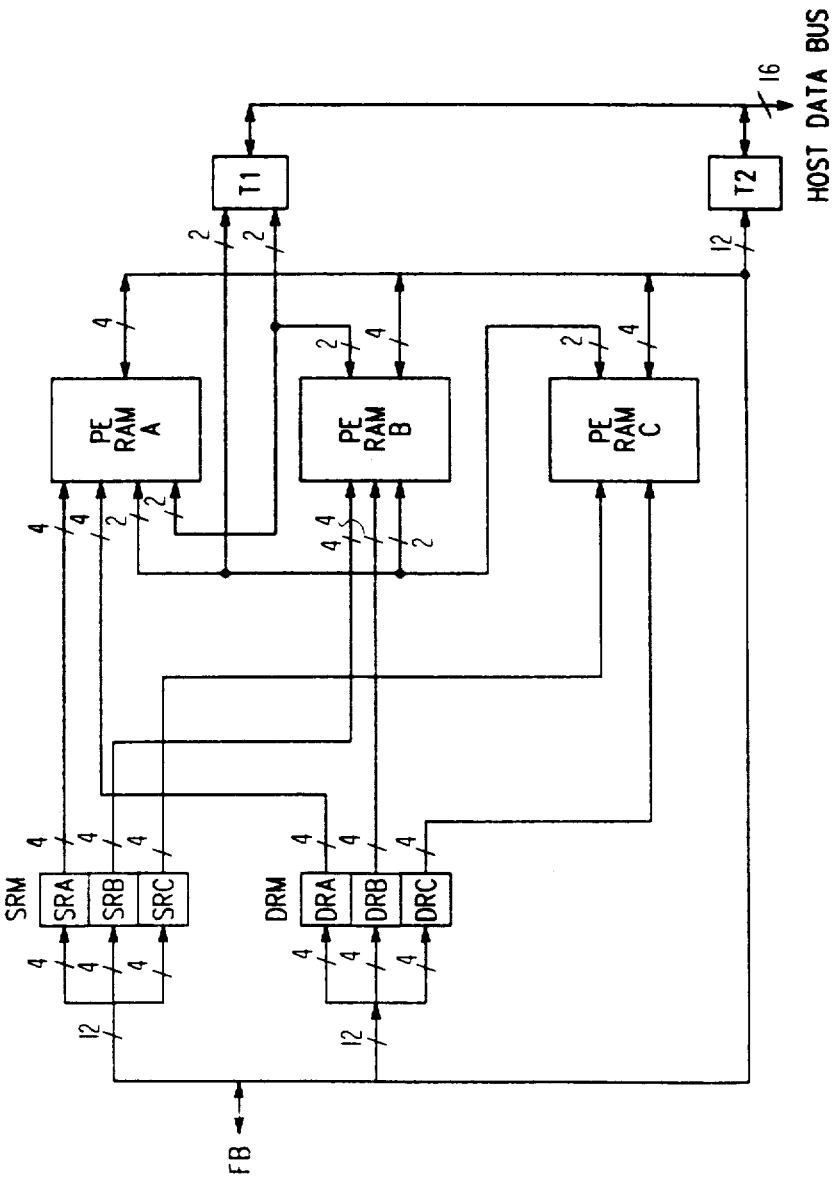

COLOR GRAPHIC PROCESSOR FOR PERFORMING LOGICAL OPERATIONS

This is a continuation of co-pending application Ser. No. 729,003 filed on Apr. 30, 1985, now abandoned.

DESCRIPTION

Technical Field

The invention relates to improvements in processors for executing logical operations on graphics representing digital data, and more specifically, multi-bit pixels which may represent more than one color.

Background Art

Digital data has been used to represent images. Computers, which process digital data, have also been used to process the image representing digital data so as to effect graphical processing. Typically, computers process data sequentially and thus originally graphical processing was effected using the sequential processing. It was readily recognized, however, that the typically large amount of graphical data that had to be processed led to unusually long processing times using the computer in a wholly sequential mode. As a result, special purpose apparatus, sometimes called image or graphics processors were developed which used some type of parallelism to effect graphical processing more quickly than a typical computer would have performed that processing using its sequential mode of operation. When graphics are represented in the black and white mode, the necessary processing could be achieved by logical combinations of the black representing and white representing information. For example, copying a source (S) to a destination (D) with a specified logical operation could be achieved by OR'ing the S with D to produce a new D.

More recently graphics representations have added the new dimension of color. Color introduces an added complexity to graphical processing. In a color system, a copy operation may require that a pixel be copied under certain conditions or that a new pixel value be produced during the copy operation. More particularly, in a typical operation in which two images may be merged or overlaid, if the two images carry different colors, information other than the mere colors may be necessary in order to produce the result. For example if the images represent opaque areas, the result depends on which of the two original images is on "top", i.e. which one is hidden? Alternatively, if the images represent semi-transparent regions, the result of overlaying one image on the other may be a color which is some blending of the colors of the two original images. In either event, processing may require some information beyond the mere color of the two original images.

Summary of the Invention

The invention achieves the desired effect by providing a color graphic processor using a processing element including a table (RAM storing predetermined data) so as to provide a variety of functions for the graphics programmer. The input pixel values are used to address the table. The information specifying each of the input pixels can include attribute data, so that the two inputs to the table will reference some stored information depending upon the attributes of the input pixels, so as to represent an attribute of the output pixel.

Accordingly, in one aspect of the invention provides a color graphic processor for performing logical operations on digital data representing graphics comprising a frame buffer for storing multi-bit pixels with an input and an output, at least one processing element including multi-bit source and destination registers and a digital memory addressable by said source and destination registers, a data path from said frame buffer output to said source and destination registers and a second data path from said digital memory to said frame buffer input, whereby pixel data output from said frame buffer addresses the digital memory and data extracted from said digital memory is written back to said frame buffer.

In order to maintain the parallelism speed advantage, the graphics processor is arranged to work on many pixels simultaneously with single instruction multiple data (SIMD) parallel operations. The tables themselves are RAMs whose sizes must be limited because they are replicated many times.

In addition to the color attribute of a pixel, Z buffer systems employ a pixel which is associated with Z values to solve hidden surface problems. The pixel thus represents in addition to the color, other attributes such as one indicating which image is "on top". By treating attributes as independent, the system uses the data to modify the frame buffer so that all attributes including the color can be modified during processing.

In this aspect, the invention provides a color graphic processor which includes a frame buffer for storing multi-bit pixels with an input and an output, at least one processing element including multi-bit source and destination registers, wherein said source and destination registers have multiple fields, and a digital memory addressable by said source and destination registers, the digital memory comprising a different digital memory section for each of the fields of the source and destination registers. Thus, one section of the digital memory can be addressed, not only by a specific field of the source and destination registers, but in addition by an output of a different section of the digital memory. Several small RAMs are effectively doing the task of one large RAM, reducing memory needs considerably.

Brief Description of the Drawings

The invention will be further described in the following portion of the specification when taken in conjunction with the attached drawings in which like reference characters identify identical apparatus and in which:

FIGS. 5A and 5B comprise a table illustrating the contents of the micro-coded memory U so as to effect functions which are described hereinafter;

FIGS. 6-8 illustrate several different graphics processing functions which are supported by preferred embodiments of the invention, in particular FIG. 6 illustrates a copy function to merge a source and destination image where the selected source pixels override selected destinaton pixels, in FIG. 7 a copy function is illustrated where coincident selected source and destination pixels produce a result pixel different from both and FIG. 8 shows a copy function where only certain pixels override others; and FIG. 9 is a block diagram of one form of a modified processing element MPE.

Detailed Description of Preferred Embodiments

Figure 1:
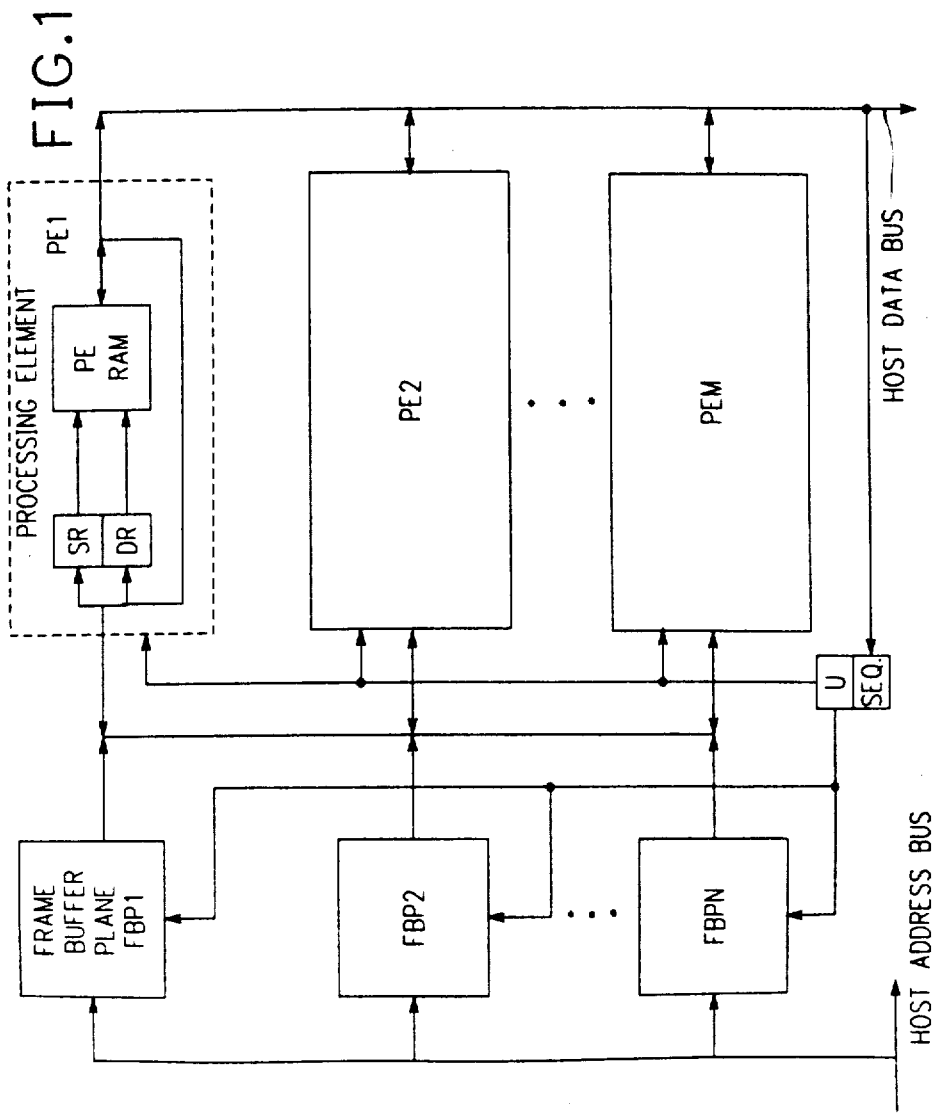
FIG. 1 is a block diagram of a preferred embodiment of the invention.

FIG. 1 shows a block diagram of the system. The Frame Buffer consists of N planes FBP1-FBPN. One bit from each plane makes up a pixel. The figure shows M processing elements PE1-PEM which can process M pixels simultaneously. The typical processing element includes a source SR and destination register DR to receive a pixel (a bit from each different plane FBP1-FBPN) which is used to address a memory PERAM which performs color bitblt (or processing) operations. The output of the PERAM is returned to the Frame Buffer (again, a bit to each different plane) and is also available to the Host Data Bus. This configuration allows for M pixels to be processed in parallel where each pixel has N bits-one bit from each Frame Buffer plane. The Frame Buffer plane, in turn, may be addressed from the Host Address Bus. The Host Data Bus controls the processing by controlling the FBP1-N and PE1-M as shown.

Figure 2:
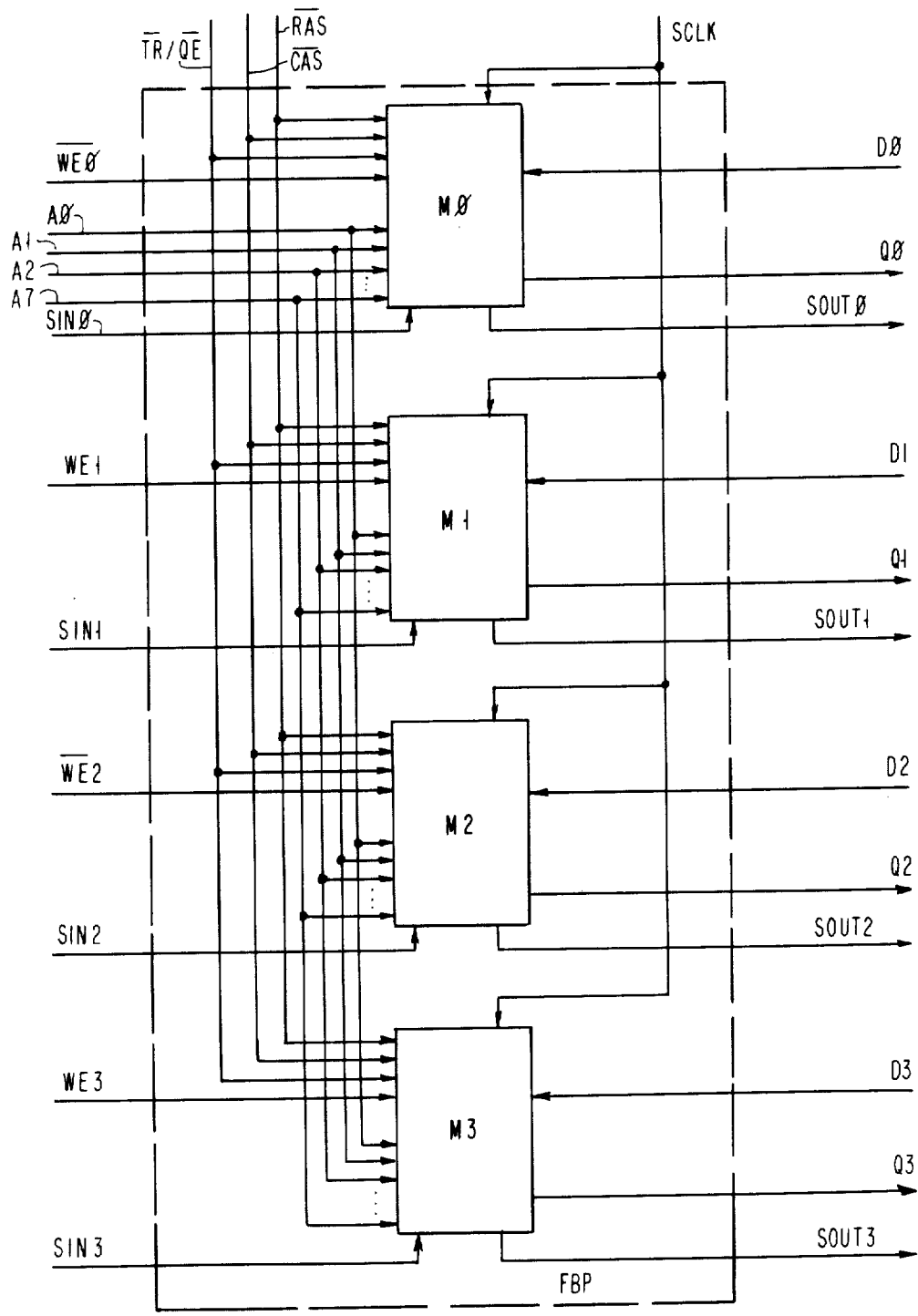
FIG. 2 is a detail of a single frame buffer plane (FBP)

FIG. 2 is a detail of one Frame Buffer plane. This embodinent shows four RAMS (M∅-M3) which may be of type Texas Instruments TMS 4161. This is a two-port RAM system. The sequential port of a RAM is governed by three signals: SCLK, SINn, and SOUTn. These controls produce video refresh. The sequential or refresh port will not be described further.

For the update parallel port, the following signals are common: the addresses A∅ through A7, RAS, CAS and $\overline{TRQE}$. The signals which are separate are: $\overline{WE∅}$-$\overline{WE3}$ (write enable), D∅-D3 (data in), Q∅-Q3 (data out). A Frame Buffer plane allows the access of one bit each for four pixels accessed in parallel. Four RAMs would allow for a CRT resolution of 512 by 512. Video RAMs M∅-M3 are assumed to be 64K by 1 for each video RAM.

Figure 3:
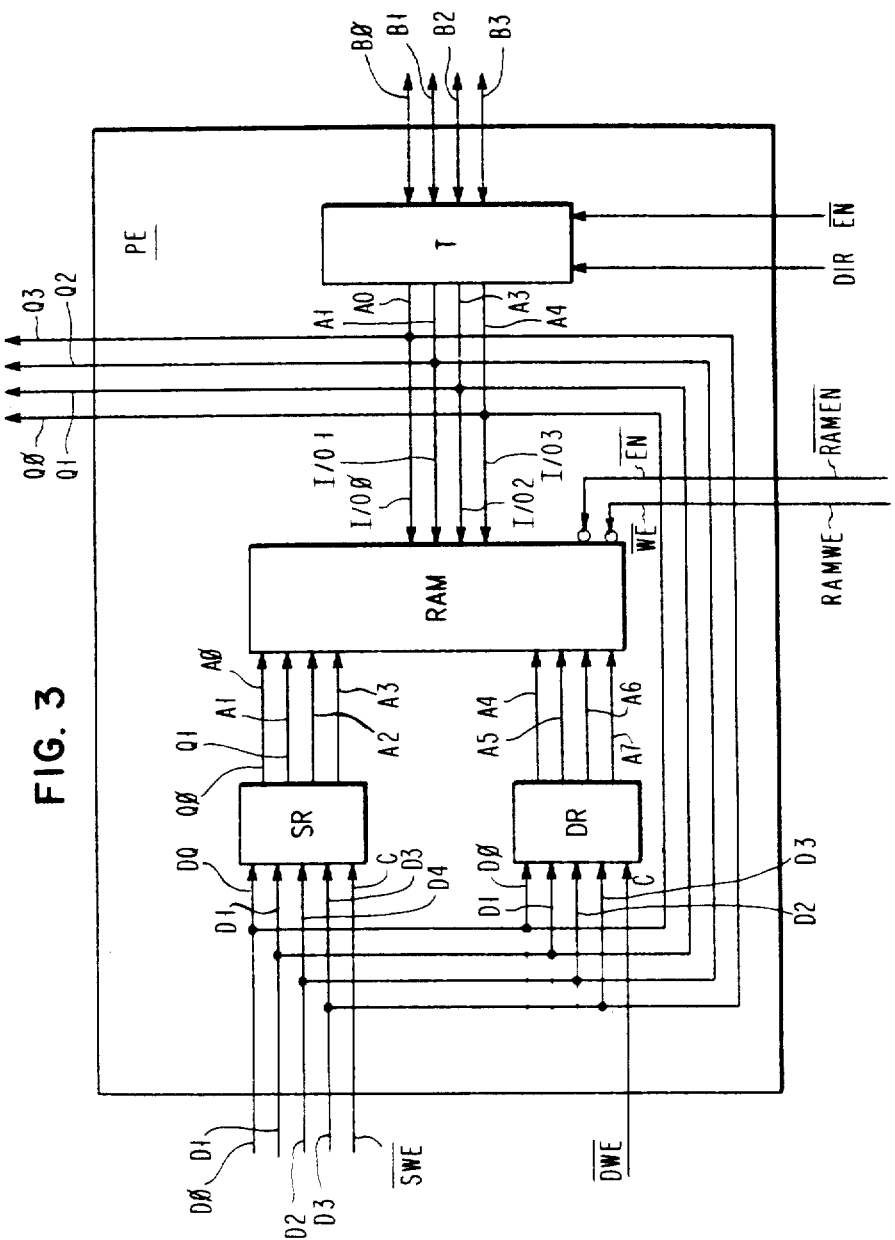
FIG. 3 is a detailed block diagram of a typical processing element PE.

FIG. 3 shows the details of a typical processing element PE. A source (SR) and destination register (DR) are shown which provide addresses to a RAM—the output of the RAM is available to a transceiver T which interfaces with the host. The inputs to the processing element are D∅-D3, which are common in both source (SR) and destination register (DR). Output to the Frame Buffer are Q∅-Q3 and outputs to the host data bus are B∅-B3. The RAM is controlled by $\overline{RAMWE}$ (RAM write enable) and $\overline{RAMEN}$ (RAM enable). The direction of the transceiver is controlled by DIR and the transceiver is enabled by $\overline{EN}$. Note that D∅-D3 are connected to Q∅-Q3. Signals $\overline{SWE}$ and $\overline{DWE}$ are used to enable the loading of the source and destination registers.

Figure 4B:
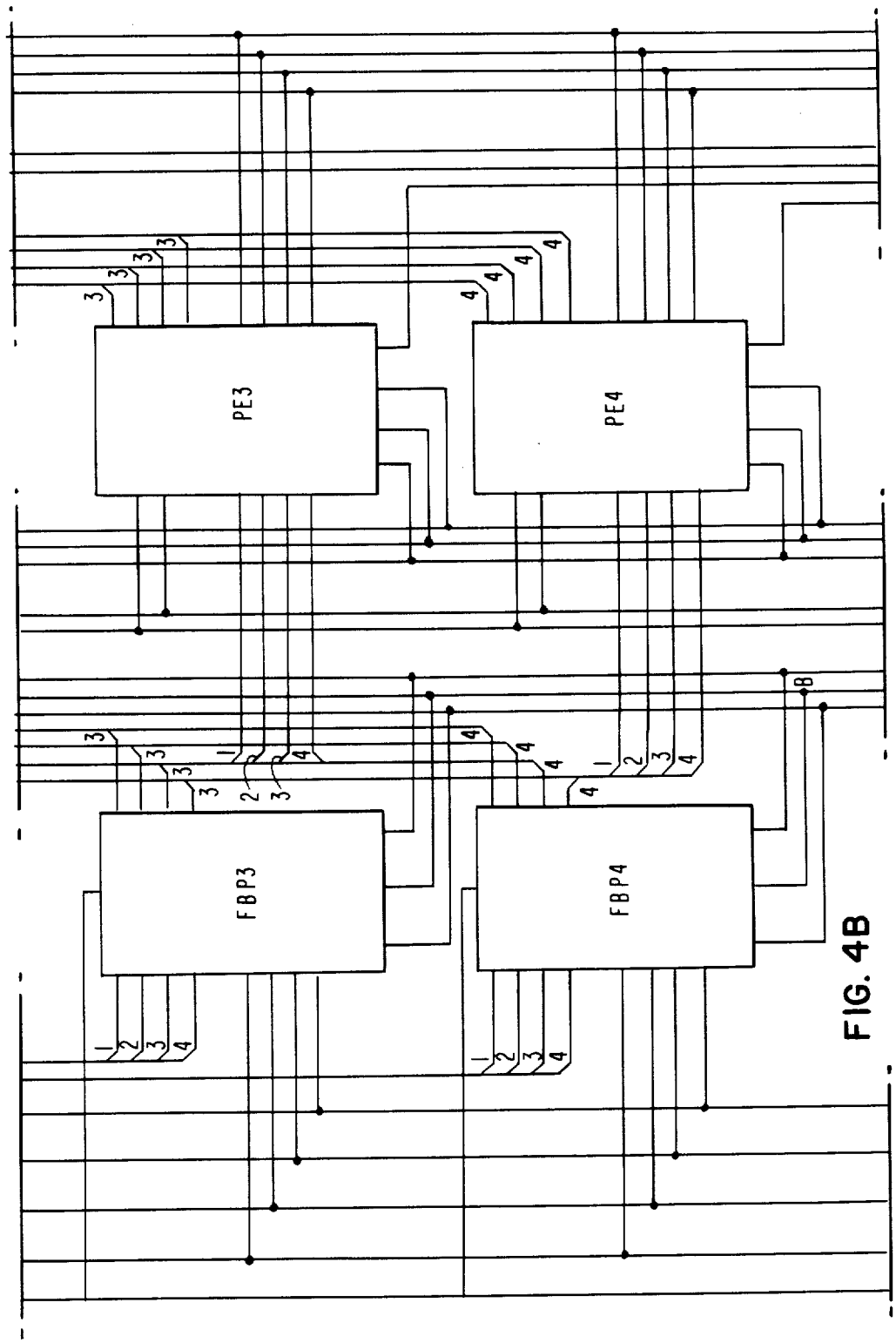
FIG. 4 is a detailed interconnection diagram of a particular embodiment providing for 4-bit pixels and operating on four pixels simultaneously and thus including FBP1-4 and PE1-4.
Figure 4C:
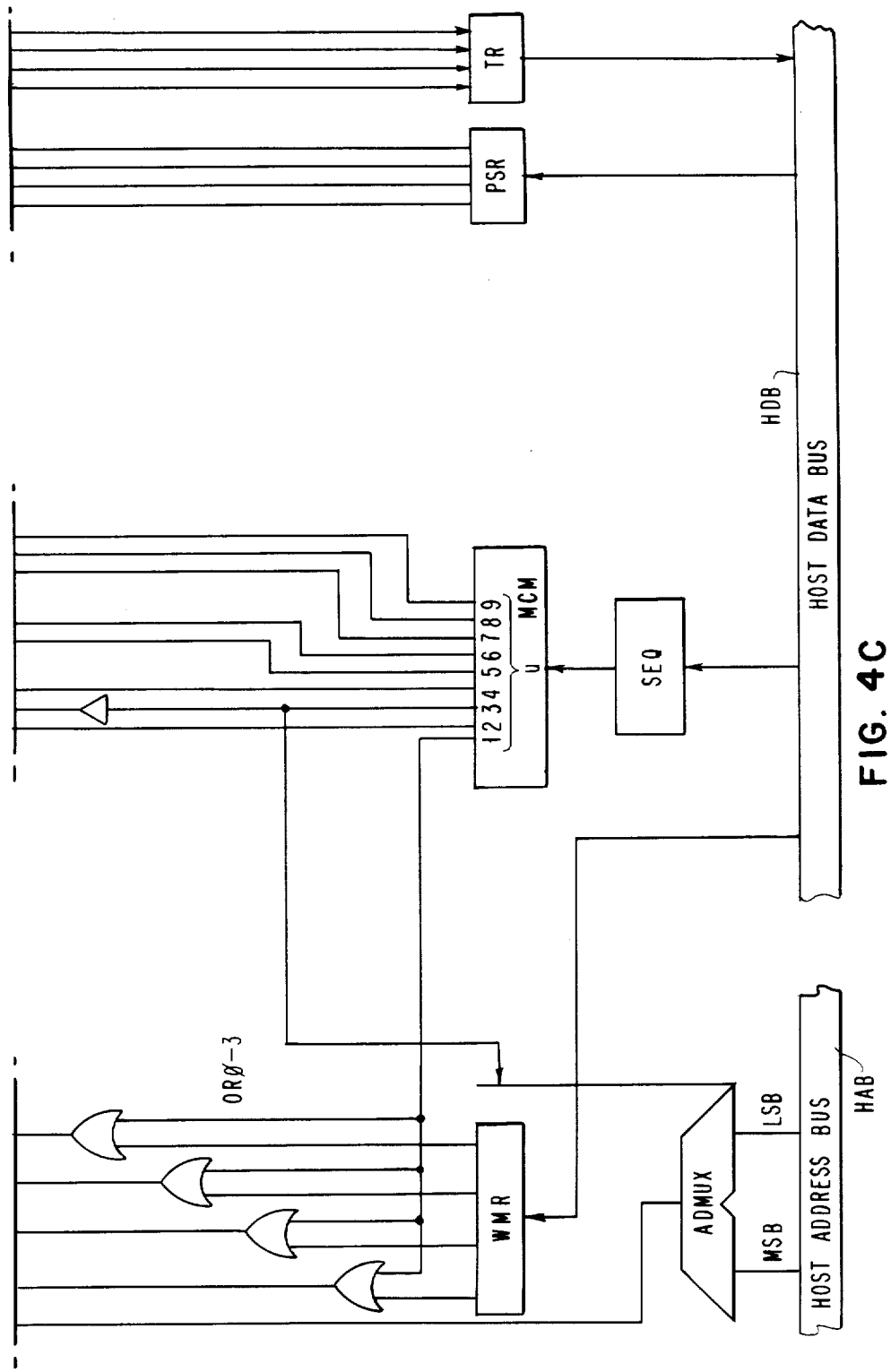

FIG. 4 shows the details of the connections between the Frame Buffer planes FBP 1-4 and processing elements PE (four Frame Buffer planes FBP1-4 and four processing elements PE1-4 are shown in this implementation). There are four buses connecting the processing elements to the Frame Buffer planes, referred to as buses b1, b2, b3 and b4. The lines of the buses, which are also numbered 1, 2, 3 and 4 show the order of the interconnections between Frame Buffer planes and the processing elements. All lines going into and out of the Frame Buffer are numbered so that the interconnections are clear. This configuration allows for four pixels to be processed in parallel where each pixel has four bits (N and M are both equal to four). The Host Address Bus (HAB) provides the addressing to the Frame Buffer. The most/least significant bytes of the 16-bit Host Address Bus (HAB) are multiplexed to the 8-bit address inputs of the Frame Buffer planes through ADMUX.

A write mask register (WMR) allows for the following: each bit of the write mask register allows a bit to be written into each four Frame Buffer planes which causes one pixel to be written into the Frame Buffer. The outputs of the processing element PE1 to PE4 (data lines B∅-B3) are connected to the transceiver TR and to themselves. The register PSR (processor element select register) controls which processing element is connected to the host data bus HDB. The write mask register WMR and the processing element register PSR are both loaded from the host data bus HDB.

The sequencer SEQ provides a sequence of control signals to the system. The sequencer SEQ provides addessing to the micro-control memory U. The nine outputs of the micro-control memory (U1-U9) are control signals for the Frame Buffer FBP1-4 and PE1-4.

The host data bus HDB provides operation codes to the sequencer SEQ which will be discussed later. It should be clear that while FIG. 4 shows N=M=4, in general N and M are completely independent.

The output of WMR enables particular pixels in all planes of the Frame Buffer, depending on the value of the control bit 1 of micro-control memory U. The control bit 1 gates the output of WMR through OR gates OR1-3. Control bits U2, U3 and U4 provide common RAS, CAS and TR/QE with a delay at Buffer B. Control bit U3 is also used to control the address multiplexer (ADMUX). Control bits U5 and U6 are source write enable and destination write enable for the processing element PE. Control bits U7, U8 and U9 are RAM enable, RAM write enable and the directional signal (DIR) for the processing element PE.

FIGS. 5A and 5B show exemplary opcodes and the control signals generated by the sequencer SEQ and micro-code memory U. The opcodes show the transfer of data between the host, Frame Buffer, the processing elements, source and destination registers and the processing elemet RAMs. The columns in FIGS. 5A-5B show in sequential order the operation code, the nine control bits, for each of the four sequencer cycles, and the data provided during each cycle. The last columns are the PSR and WSR register data values legal or valid during each cycle.

Column 1 shows the operation name. There are eight basic data transfer operations. They are: PE RAM to Frame Buffer (FB), Frame Buffer (FB) to PE Source Register (PESR), Frame Buffer (FB) to PE Destination Register (PEDR), Frame Buffer (FB) to Host, Host to Frame Buffer (FB), Host to PE Source Register (PESR), Host to PE Destination Register (PEDR), and Host to PE RAM.

Figure 6:
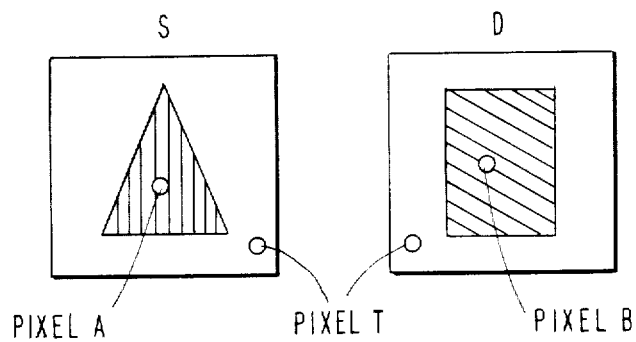

FIG. 6 shows an example of a copy function to combine or merge a source image S with the destination image D, to produce a new destination image. The source image includes two types of pixles, as shown in FIG. 6, A-pixels are of a first color, whereas T-pixels are transparent. The destination image includes similar T-pixels, as well as B-pixels which are of a color different than the A-pixels in the source image. We assume that the graphics programmer desires to produce a new destination image (the A-pixels) to override the B-pixels. The table in FIG. 6 has three columns, the S column identifies the two types of pixels in the source image and the D column identifies the two type of pixels in the destination image. The third column shows the result. There are four different cases indicated on each of the different rows 1-4. Row 1 indicates that where A and B pixels occupy a common pixel, the A pixel should be the result. Row 2 indicates that where a transparent pixel T in the source image is in a common position with a B pixel from the destination image, then the result is a B pixel. Row 3 indicates that were an A pixel from the source image overrides a T pixel in the destination image, the result should be an A pixel.

Finally, row 4 indicates that where T pixels are at a common location, the resulting image should be a T pixel.

From the preceding description it should be apparent that by loading the PERAM to reflect the table shown in FIG. 6, the apparatus shown in FIGS. 1-4 will produce the desired result. More particularly, when the source register SR is loaded with data representing an A pixel, and the destination register DR is loaded with a value corresponding to a B pixel, the output of the PERAM will be an A pixel. Similar results for each of the different rows in FIG. 6 should be apparent.

FIG. 7 shows a different operation. In FIG. 7, the source and destination images are shown at S and D, respectively. The result (new D) indicates that in regions of the image which have pixel A and pixel B in common, the result should be pixel C (for example a new color). The table of FIG. 7 shows how this result is created by properly loading the PERAMs. More particularly, the first row of the table in FIG. 7 shows that when A and B pixels occupy corresponding regions in source and destination images, the PERAM produces an output corresponding to a new C pixel providing, for example, the effect of translucency.

FIG. 8 shows finally a still different operation. This figure illustrates 2.5 D images with color priority. The color represents the Z coordinate of the object. In FIG. 8 the source and destination images S and D are illustrated. The source region includes a single rectangular area of A pixels. The destination image includes, over a background (not specifically identified), three different types of pixels, B, C and D (for example these may be of different colors) with a portion of the region corresponding to pixel D being hidden by other regions, and a portion of the region corresponding to C pixels also being hidden. The desired result is shown in the new D. More particularly, the A pixels are to be hidden by regions of B and C pixels, but on the other hand, the region of D pixels is to be hidden by the region of A pixels. The table in FIG. 8 shows, on different rows, the eight different cases. The first row indicates that where A and B pixels occupy identical locations, the result is to be a B pixel (e.g. the B pixels hide or overlie the A pixels). Row 2 indicates that the same condition is true for A and C pixels. On the other hand, row 3 shows that the A pixels overlie or hide the D pixels. Finally, rows 4-8 indicate respectively that the A pixels overlie the background in the destination image, and that the D, C and B pixels of the destination image overlie the background of T pixels of the source image, and that where background or T pixels are similarly located in both source and destination images, the result is a T pixel. It should be apparent to those skilled in the art that by loading PERAM with data such as shown in the table of FIG. 8, the desired result will be produced by the apparatus of FIGS. 1-4.

FIG. 9 shows a different processing element MPE which can process pixels and independent attributes. In FIG. 9, SR and DR have been replaced by SRM and DRM, each with three fields, SRA-SRC and DRA-DRC. The PERAM is replaced with PERAMA, PERAMB and PERAMC. This processing element is for a system of 12-bit words accessed from the Frame Buffer, four bits of basic pixel data and eight bits of independent attribute data. The Frame Buffer of FIG. 4 is extended to a 12-bit system instead of a 4-bit system (the number of bits per word is arbitrary). There are twelve Frame Buffer planes FBP1-12 and an arbitrary number of processing elements, for example four. We have arbitrarily assumed the pixels to be four bits of basic pixel data and the attributes to be eight bits long. This system allows for a 4-bit pixel (representing color and/or intensity) and two 4-bit independent attributes. Transceiver T2 which is a 12-bit transceiver is used to communicate with the Frame Buffer (FB) and source/destination registers (DRM, SRM). T2 also allows communications of twelve bits with RAMs A, B, C—four bits from each. Two bits of the output of RAMs of B and C are communicated through T1 to the host data bus forming four bits. A total of 16 bits to the host data bus are communicated via T1 and T2. Thus T1 serves for the loading of RAMs while T2 both communicates with the Frame Buffer and the source/destination register and the loads of the RAMs.

In connection with FIG. 9 lets assume that the A, B and C fields of the pixel respectively relate to color, transparency attributes and a Z value. As shown in FIG. 9 both the source and destination registers SRM and DRM include fields SRA-SRC and DRA-DRC. As is the case in other embodiments of the invention the source and destination registers are loaded from the frame buffer and are used to address the table in the processing element. The modified processing element MPE of FIG. 9 shows that the different fields of SRM and DRM address respectively PERAMA-PERAMC, respectively. The tables stored in PERAMA-PERAMC can be loaded from the host data bus, and can be loaded as frequently as between different sequential operatons so as to perform a suitable function by table look-up. The PERAMC can compare the Z attribute of the source and destination pixels to determine which pixel is "hidden" by the other. The result of this operation (which is really a comparison) is passed and can be used to assist in addressing PERAMB. Likewise, the output of PERAMB can be used to address PERAMA. The result, e.g. the output of PERAMA can be expressed as a value:

RES=OUTA(FS1, FD1, OUTB(FS2, FD2, OUTC(FS3, FD3), OUTC(FS3, FD3))

where:
RES is the result for a color value to be written into the frame buffer FB,
OUTX is the output of RAM X,
FSn is a field n (an attribute field) from the source register,
FDn is a field n (an attribute field) from the destination register.

Referring for example to FIG. 9, copy operations can be made with pixels having properties of opaque, transparent and translucent. The Z values determine which pixel is on "top", by the contents in PERAMC. The output of PERAMC plus the transparencies attributes (the B field) determines one of three results, the color value of the source register can be copied, the color value of the destination register can be copied, or the color value of neither register is copied and a new translucent color value is copied. The result of the transparency field B is used to address the PERAMA, to determine the result.

In a second and more limited example, the A field could be the color field, where the B and C fields are respectively low order and high order Z values. In this event the output of PERAMC may indicate either the source or destination image is on "top", or an equality. In the latter case, the output of PERAMB determines whether source or destination image is on "top" to resolve the equality result from PERAMC.

In a still more simple example, we eliminate the C field, so that the MPE has tables PERAMA and PERAMB, and both SRM and DRM include fields SRA and SRB, DRA and DRB. In this example the A table and fields represent color and the B table and fields represent Z value. Thus the pixel information includes both color and Z value. PERAMB has information useful to compare Z values and produce a 2-bit result for PERAMA. PERAMA does a copy operation using the Z information to produce the correct value to be returned to the frame buffer.

Having thus described our invention, what we claim as new, and desire to secure by Letters Patent is:

1. A color graphic processor for performing logical operations on graphics representing digital data comprising:

a multi-plane frame buffer for storing multi-bit pixels with an input and an output, at least one processing element including multi-bit source and destination registers, said source and destination registers including multiple fields, and said processing element further including a digital memory addressable by said source and destination registers, said digital memory having an output of sufficient capacity to accommodate a width of said multi-bit pixel, said digital memory including a plurality of digital memory sections, each digital memory section addressed by a different field of said source and destination registers in combination, a data path from said frame buffer output to said source and destination registers and a second data path from said digital memory output to said frame buffer input, whereby pixel data output from said frame buffer addresses said digital memory and data extracted from said digital memory is written back to said frame buffer.

2. The processor of claim 1 in which said frame buffer has a number of different planes equal to the number of bits in said multi-bit pixel, and which further includes M different processing elements of M different multi-bit pixels where M is an integer greater than 1.

3. The processor claim 1 which includes a further data path from at least one output of a section of said digital memory to an addressing input of another section of said digital memory.

4. The processor of claim 1 which further includes a data bus coupled to a data input of said digital memory for writing predetermined data therein.

5. The processor of claim 3 which further includes a data bus coupled to a data input of said digital memory for writing predetermined data therein.

6. The processor of claim 5 which includes a plurality of said processing elements and which further includes a host computer wherein said data bus is a data bus of said host computer and which further includes an address bus, an address multiplexer coupled between said host address bus and addressing inputs of said frame buffer, a microcoded memory driven by said host data bus with an output coupled to control inputs of said processing elements.

7. The processor of claim 6 in which each of said processing elements includes a transceiver coupled between said host data bus and an input/output of said digital memory whereby data on said host data bus can be input to said digital memory or data from said digital memory can be written onto said data bus in response to different of said control inputs derived from said microcoded memory.

8. A method of color graphic processing for performing logical operations on graphics representing digital data utilizing means for processing comprising the steps of:

(a) providing a plurality of data tables, (b) providing a multi-bit frame buffer, (c) extracting multi-bit pixels, representing two regions of an image to be merged, from two different locations of said frame buffer utilizing said processing means, said multi-bit pixels having a plurality of fields, (d) addressing said data tables with said multi-bit pixels to produce a multi-bit result pixel by addressing different ones of said data tables with different fields of at least two of said multi-bit pixels in combination, and (e) writing said multi-bit result pixel into said frame buffer utilizing said processing means.

9. The method of claim 8 in which said addressing step includes addressing at least one of said tables with an output of a different one of said tables.

10. The method of claim 8 wherein said multi-bit result pixel is written to a location in said frame buffer identical to a location from which one of said extracted multi-bit pixels were extracted.

11. The method of claim 10 in which said multi-bit result pixel is identical to one of said extracted multi-bit pixels.

12. The method of claim 10 in which said multi-bit result pixel is different from either of said extracted multi-bit pixels.

13. The method of claim 10 which includes the further step of:

transferring data from a host computer to write said data table.

* * * * *

UNITED STATES PATENT AND TRADEMARK OFFICE
CERTIFICATE OF CORRECTION

PATENT NO. : 4,823,281

DATED : April 18, 1989

INVENTOR(S) : Evangelisti et al

It is certified that error appears in the above-identified patent and that said Letters Patent is hereby corrected as shown below:

Col. 1, line 22, after "using", delete "the";

line 32, after "in", change "the" to -a-.

Col. 2, line 1, delete "of";

line 65, delete "the".

Col. 3, line 34, change "$\overline{TRQE}$" to -$\overline{TR/QE}$-.

Col. 4, line 60, change "pixles" to -pixels-.

Col. 5, line 1, change "type" to -types-;

line 9, change "were" to -where-;

line 62, change "of" (1st) to -or-.

Col. 6, line 43, change "operatons" to -operations-.

Col. 7, line 60, after "elements" insert -to provide for simultaneous processing-;

line 62, after "The" insert -of-.

Signed and Sealed this

Twenty-seventh Day of February, 1990

*Attest:*

JEFFREY M. SAMUELS

*Attesting Officer*  *Acting Commissioner of Patents and Trademarks*